3,366,440
PROCESS FOR MANUFACTURING A COL-
LAGEN FABRIC-FILM LAMINATE
Elie S. Nuwayser, Basking Ridge, N.J., assignor to
Ethicon, Inc., a corporation of New Jersey
No Drawing. Filed Nov. 3, 1964, Ser. No. 408,682
8 Claims. (Cl. 8—115.6)

ABSTRACT OF THE DISCLOSURE

An absorbable surigal prosthesis is manufactured by forming a collagen fabric from collagen strands, tanning the fabric, coating the fabric with a fluid mass of swollen collagen fibrils, and tanning the collagen fabric-film laminate.

---

The present invention relates to a collagen fabric-collagen film laminate that is useful in surgery and to a method of manufacturing such a product.

During the past two decades striking advances have been made in reparative surgery. This program has resulted primarily from the development of suitable materials for bridging defects and surgical techniques for their successful utilization.

Prostheses have been used for many years in hernia operations to reinforce the abdominal walls. More recently fabric prostheses of Dacron and Teflon have been utilized in the surgical repair of defects in the chest and the peritoneum. Such fabric prostheses that have been rendered bloodtight by the presence of body-absorbable collagen fibrils in the interstices of the fabric are described and claimed in copending application Ser. No. 92,620, filed Mar. 1, 1961.

Inert fabric prostheses have the disadvantage, however, that they are not absorbed but remain in the body for the life of the patent. The ideal prosthesis should retain its strength in intimate contact with body fluids until the healing process is completed and then be absorbed and replaced by new tissue that is formed *in situ* by the patient.

The present invention has for its principal object the provision of flexible laminated sheets and films which are compatible with the human body and constructed entirely of collagen.

Another object of this invention is the manufacture of collagen prosthesis that will be entirely absorbed by the human body.

It has now been discovered that an improved prosthesis can be constructed using as a framework or support a collagen fabric woven, knitted, crocheted or braided of collagen strands. The collagen strands may be tanned either prior to manufacture of the fabric or subsequent thereto. In the prosthesis of the present invention the interstices between the collagen strands are filled and rendered bloodtight by tanned collagen fibrils, which form a sheet of film that is laminated to at least one surface of the fabric.

It is an advantage of the prosthetic material of the present invention that it has a high tensil strength and is somewhat elastic when wet. The fabric layer of the laminate contributes good suture holding properties and the collagen fibril layer of the laminate provides a semipermeable microbial barrier that is non-adhesiogenic. The prosthesis of the present invention is slowly absorbed with concomitant replacement by autologous fibrous tissue.

The collagen strands of which the fabric portion of the fabric-film laminate is constructed may be prepared by the method described in U.S. Patent No. 3,114,593. Alternatively, the fabric may be woven of a collagen multifilament prepared as described in copending application Ser. No. 216,247, filed Aug. 10, 1962. That application teaches that the adhesive bonds that normally form between the individual monofilaments can be disrupted and the multifilaments recovered in essentially the same form in which it leaves the spinnerette surface by isolating a section of the dried bundle of adhered monofilaments between two points and mechanically imparting thereto a variable tension in a direction parallel to the longitudinal axis of the bundle. Since it is important to prevent breaking any of the collagen monofilaments the applied tension must at no time exceed the elastic limit of the monofilaments.

The structure of the prosthesis of the present invention is that of a laminated fabric. As indicated above the fabric may be woven of collagen multifilament or collagen strands. Preferably the collagen fabric is a leno weave as this weave has good suture holding properties combined with high tensile strength.

The fabric is tanned to a degree that is dependent upon the desired absorption characteristics of the prosthesis. Alternatively the collagen multifilament or strands may be tanned prior to forming the fabric. It is preferred, however, that the fabric be tanned after it is woven as the collagen swells slightly in the tanning solution. When the fabric is dried, subsequent to the tanning step the softened warp strands or multifilaments have a tendency to cohere to the softened woof strands or multifilament at the points of contact.

The tanned fabric is laminated to a sheet or film of collagen fibrils, that may be conveniently formed by coating at least one side of the fabric with a swollen mass of collagen fibrils. The collagen fibrils fill the interstices of the fabric and cohere thereto to form a fabric-film laminate. The in vivo absorption characteristics of the collagen film like those of the fabric may be controlled by the degree of tanning and the collagen fibrils that make up the film may be tanned before or after application to the fabric.

The process for the manufacture of the fabric-film laminate of the present invention and the nature of the product obtained, may be more fully understood from the following detailed description and examples which are explanatory but do not restrict the invention. Throughout the examples that follow all quantities are expressed in parts by weight unless otherwise indicated.

EXAMPLE I

*Chrome, pyrogallol, formaldehyde tanned fabric-formaldehyde tanned film*

Untanned collagen strands are prepared by the general procedure described in Examples I and II of U.S. Patent No. 3,114,593. The spinnerette employed had 69 orifices and resulted in a size 4/0 collagen strand (8.2 mils in diameter). The alum-formaldehyde tanning solution employed at the godet 102 is replaced with water and an untanned collagen strand is collected on the take-up spool. The loosely adhered multifilament strand so obtained is mechanically flexed under tension in a direction parallel to the longitudinal axis of the strand to separate the cohered monofilaments and produce a multifilament made of 69 individual collagen monofilaments.

This untanned collagen multifilament is woven into a leno fabric as follows:

A warp is prepared from 160 ends of 440 denier collagen multifilament having 2½ twists per inch. The reed has two ends per dent in alternate dents of a 20 reed, set 8" wide in the reed. The fabric is woven with 22 picks per inch of 440 denier untwisted collagen multifilament. The loom on which this fabric is woven is equipped with a leno attachment. This results in a fabric, the warp threads of which are twisted collagen multifilament (440 denier 2½ twists per inch) and the filling threads of which are untwisted 440 denier collagen multifilaments. The thread count of this fabric is 20 threads per inch but a more open fabric having a thread count of 16 or even 10 is suitable for preparing the fabric-film laminate of the present invention.

A piece of this leno fabric 72" long and 7" wide is tanned for five minutes in a solution containing 1% formaldehyde and chromium sulfate at a concentration equivalent to 0.4% $Cr_2O_3$, pH 3.9. The fabric is removed from this solution and allowed to dry in air for an additional five minutes after which it is given three one-minute washes in distilled water. The fabric is then treated for five minutes in a solution containing 0.5% pyrogallol and 0.6% sodium hydrosulfite. It is removed from this solution, allowed to dry for five minutes in air, and washed three times for one minute in distilled water. The tanned fabric is then permitted to dry while stretched on a frame to a dimension of 60–65" in length and 6" in width.

Twelve hundred parts of a collagen dispersion prepared according to Example I of U.S. Patent No. 3,114,593, and containing approximately 1% collagen is pretanned with formaldehyde by adding 2 parts of 1% aqueous formaldehyde per 100 parts of dispersion and mixing in a Waring Blender for about fifteen seconds. A glass plate is coated with a release agent (a tetrafluoroethylene polymer). A piece of the tanned collagen fabric 28" long and 7" wide is placed on the plate and a small quantity of the pretanned dispersion, previously deaerated in vacuum, is worked into the fabric, levelled to a depth of ⅛" and permitted to dry. This results in a film approximately 1 mil thick laminated to the fabric.

The film is washed in water to remove excess acid, and air-dried.

EXAMPLE II

*Transparent siliconized fabric-film laminate*

This material is prepared as described in Example I except that the fabric is washed first in carbon tetrachloride for 5 minutes. The fabric is then removed from the solution and allowed to dry in air for 5 minutes. A glass plate is coated with a silicone release agent. The washed fabric, prior to lamination, is wetted for 5 minutes in a collagen dispersion diluted tenfold with distilled water. About 600 ml. of the pretanned and deaerated collagen dispersion is placed on the siliconized glass plate. The wet fabric is layered on top of the dispersion and allowed to soak in it for 5 minutes. The remainder of the dispersion is then applied over the fabric. This results in a fabric-film laminate, one surface of which is a replica of the glass plate on which it is formed.

This prosthesis has found successful experimental application as a partial replacement for the dura in neurosurgery.

EXAMPLE III

*Chrome, pyrogallol, formaldehyde tanned fabric-chrome, pyrogallol, formaldehyde tanned film*

A collagen fabric laminate is prepared as described above except that the collagen dispersion is pretanned with 2 parts of 1% formaldehyde per 100 parts of dispersion and 2 parts of 0.5% pyrogallol per 100 parts of dispersion. After the dispersion has dried, the laminate is treated for 30 minutes with chromium sulfate at a concentration equivalent to 0.4% $Cr_2O_3$ after which it is washed with five gallons of distilled water.

EXAMPLE IV

*Formaldehyde tanned fabric-formaldehyde tanned film*

This material is prepared as described in Example I except that the fabric is tanned for 5 minutes in a solution containing 1% formaldehyde, at pH 4.0. The fabric is removed from the solution, allowed to dry in air for 5 minutes, and is washed three times for one minute in distilled water. The fabric treated by this method is not as readily stretched as that containing the chromium salt and is dried while stretched on a frame 55–60" long and 5" wide.

EXAMPLE V

*Siliconized collagen fabric-film laminate*

A piece of collagen fabric-film laminate prepared by any of the examples given above is washed three times in acetone and permitted to dry. Silastic Medical Adhesive, (Silicone Type A,) is spread on the surface of the laminate with a spatula and permitted to cure at room temperature overnight. The curing process is carried out in a suitable chamber so that no dust can contaminate the surface. The amount of silicone used was such that 0.33 g. of polymer per square inch of laminate was deposited. The thickness of this layer may be varied according to the properties desired.

While the invention has been described in detail according to the preferred manner of carrying out the process and yielding the products, it will be obvious to those skilled in the art, after understanding the invention, that changes and modifications may be made therein without departing from the spirit or scope of the invention and it is intended in the appended claims to cover such changes and modifications.

What is claimed is:
1. The method of preparing a collagen prosthesis which comprises:
   weaving, knitting, crocheting, or braiding a wholly collagen fabric from strands of spun oriented collagen fibrils;
   tanning the collagen fabric so obtained;
   wetting the tanned collagen fabric with a dilute fluid mass of swollen collagen fibrils;
   deaerating a fluid mass of swollen collagen fibrils;
   forming a layer of the deaerated fluid mass of swollen collagen fibrils;
   placing the tanned collagen fabric upon the layer of swollen collagen fibrils, whereby one surface of the fabric is coated with said fluid mass;
   covering the other surface of the tanned collagen fabric with a second layer of swollen collagen fibrils;
   drying the coated and tanned collagen fabric to form a fabric film laminate; and,
   tanning the collagen fabric-film laminate.
2. The method of claim 1 wherein the strands of collagen are collagen multifilaments.
3. The method of preparing a collagen prosthesis which comprises:
   weaving, knitting, crocheting, or braiding a wholly collagen fabric from strands of spun oriented collagen fibrils;
   tanning the collagen fabric so obtained;
   tanning a fluid mass of swollen collagen fibrils;
   wetting the tanned collagen fabric with a dilute fluid mass of tanned collagen fibrils;
   deaerating a fluid mass of tanned collagen fibrils;
   forming a layer of the deaerated fluid mass of tanned collagen fibrils;
   placing the tanned collagen fabric upon the layer of tanned collagen fibrils, whereby one surface of the fabric is coated with said fluid mass;
   covering the other surface of the tanned collagen fabric with a second layer of tanned collagen fibrils; and,
   drying the coated and tanned collagen fabric to form a fabric-film laminate.
4. The method of claim 3 wherein the strands of collagen are collagen multifilaments.
5. The method of preparing a collagen prosthesis which comprises:
   weaving, knitting, crocheting, or braiding a wholly collagen fabric from strands of tanned spun oriented collagen fibrils;

wetting the tanned collagen fabric so obtained with a dilute fluid mass of swollen collagen fibrils;
deaerating a fluid mass of swollen collagen fibrils;
forming a layer of the deaerated fluid mass of swollen collagen fibrils;
placing the tanned collagen fabric upon the layer of swollen collagen fibrils, whereby one surface of the fabric is coated with said fluid mass;
covering the other surface of the tanned collagen fabric with a second layer of swollen collagen fibrils;
drying the coated and tanned collagen fabric to form a fabric-film laminate; and,
tanning the collagen fabric-film laminate.

6. The method of claim 5 wherein the strands of collagen are collagen multifilaments.

7. The method of preparing a collagen prosthesis which comprises:
weaving, knitting, crocheting, or braiding a wholly collagen fabric from strands of tanned spun oriented collagen fibrils;
tanning a fluid mass of swollen collagen fibrils;
wetting the collagen fabric with a dilute fluid mass of tanned collagen fibrils;
deaerating a fluid mass of tanned collagen fibrils;
forming a layer of the deaerated fluid mass of tanned collagen fibrils;
placing the tanned collagen fabric upon the layer of tanned collagen fibrils, whereby one surface of the fabric is coated with said fluid mass;
covering the other surface of the tanned collagen fabric with a second layer of tanned collagen fibrils; and,
drying the coated collagen fabric to form a fabric-film laminate.

8. The method of claim 7 wherein the strands of collagen are collagen multifilaments.

References Cited
UNITED STATES PATENTS

| | | | |
|---|---|---|---|
| 2,934,447 | 4/1960 | Highberger et al. | 162—2 |
| 3,223,551 | 12/1965 | Tu | 117—140 |
| 3,272,204 | 9/1966 | Artandi et al. | 128—334 |
| 3,276,448 | 10/1966 | Kronenthal | 128—334 |

NORMAN G. TORCHIN, *Primary Examiner.*
DONALD LEVY, *Examiner.*